US010204382B2

(12) United States Patent
Morin et al.

(10) Patent No.: US 10,204,382 B2
(45) Date of Patent: Feb. 12, 2019

(54) METHOD AND SYSTEM FOR IDENTIFYING USERS WHO BENEFIT FROM FILING ITEMIZED DEDUCTIONS TO REDUCE AN AVERAGE TIME CONSUMED FOR USERS PREPARING TAX RETURNS WITH A TAX RETURN PREPARATION SYSTEM

(71) Applicant: Intuit Inc., Mountain View, CA (US)

(72) Inventors: Yao H. Morin, San Diego, CA (US); Massimo Mascaro, San Diego, CA (US); Preetam Kumar Ojha, Poway, CA (US)

(73) Assignee: Intuit Inc., Mountain View, CA (US)

( * ) Notice: Subject to any disclaimer, the term of this patent is extended or adjusted under 35 U.S.C. 154(b) by 311 days.

(21) Appl. No.: 14/726,051

(22) Filed: May 29, 2015

(65) Prior Publication Data

US 2016/0350870 A1    Dec. 1, 2016

(51) Int. Cl.
*G06Q 40/00* (2012.01)
*G06N 99/00* (2010.01)

(52) U.S. Cl.
CPC ......... *G06Q 40/123* (2013.12); *G06N 99/005* (2013.01)

(58) Field of Classification Search
CPC .......................... G06Q 40/123; G06N 99/005
See application file for complete search history.

(56) References Cited

U.S. PATENT DOCUMENTS

| 6,922,488 B2 | 7/2005 | Mastrianni et al. |
| 6,973,418 B1 | 12/2005 | Kirshenbaum |
| 7,788,137 B1 | 8/2010 | Tifford |
| 7,797,166 B1 | 9/2010 | Bradley et al. |
| 8,090,794 B1 | 1/2012 | Kilat et al. |
| 8,190,499 B1 | 5/2012 | McVickar |
| 8,407,113 B1 * | 3/2013 | Eftekhari ............. G06Q 40/123 705/31 |
| 8,490,018 B2 | 7/2013 | Carter et al. |
| 8,768,313 B2 | 7/2014 | Rodriguez |
| 8,806,444 B1 | 8/2014 | Podgorny et al. |
| 9,355,650 B2 | 5/2016 | Dimitriadis et al. |

(Continued)

FOREIGN PATENT DOCUMENTS

WO    WO 2016/039779    3/2016

*Primary Examiner* — Scott S Trotter
(74) *Attorney, Agent, or Firm* — Hawley Troxell Ennis & Hawley LLP; Philip McKay

(57) ABSTRACT

A method and system identifies users who benefit from filing itemized deductions over standardized deductions to reduce an average time consumed for users preparing tax returns with a tax return preparation system, according to one embodiment. The method and system receives user data that is associated with a user, and applies the user data to a predictive model to cause the predictive model to determine a likelihood that the user will decrease his/her taxable income by filing an itemized deduction, according to one embodiment. The method and system deemphasizes and/or postpones the presentation of tax return questions that are related to the itemized deduction, if the likelihood that the user will decrease his/her taxable income by filing the itemized deduction is below a threshold, to reduce a quantity of time consumed by the user to prepare his/her tax return with a tax return preparation system, according to one embodiment.

26 Claims, 5 Drawing Sheets

(56) References Cited

U.S. PATENT DOCUMENTS

| | | | |
|---|---|---|---|
| 9,378,065 B2 | 6/2016 | Shear et al. | |
| 9,444,824 B1 | 9/2016 | Balazs et al. | |
| 9,648,171 B1 | 5/2017 | Eftekhari et al. | |
| 9,891,792 B1 | 2/2018 | Morin et al. | |
| 9,983,859 B2 | 5/2018 | Mascaro et al. | |
| 2002/0152457 A1 | 10/2002 | Jahnke | |
| 2006/0155632 A1 | 7/2006 | Cherkas et al. | |
| 2006/0294084 A1 | 12/2006 | Patel et al. | |
| 2008/0071703 A1 | 3/2008 | Evans | |
| 2008/0127127 A1 | 5/2008 | Chitgupakar et al. | |
| 2008/0147494 A1 | 6/2008 | Larson | |
| 2009/0106178 A1 | 4/2009 | Chu | |
| 2009/0313086 A1 | 12/2009 | Lee et al. | |
| 2011/0264569 A1 | 10/2011 | Houseworth et al. | |
| 2012/0109792 A1 | 5/2012 | Eftekhari et al. | |
| 2013/0198047 A1 | 8/2013 | Houseworth et al. | |
| 2013/0268468 A1 | 10/2013 | Vijayaraghavan et al. | |
| 2013/0282539 A1 | 10/2013 | Murray | |
| 2014/0067518 A1 | 3/2014 | McGovern | |
| 2014/0068600 A1 | 3/2014 | Ashok et al. | |
| 2014/0122381 A1 | 5/2014 | Nowozin | |
| 2014/0201045 A1 | 7/2014 | Pai et al. | |
| 2014/0359261 A1 | 12/2014 | Collins et al. | |
| 2015/0227962 A1 | 8/2015 | Wical et al. | |
| 2016/0012350 A1 | 1/2016 | Narayanan et al. | |
| 2016/0098804 A1 | 4/2016 | Mascaro et al. | |
| 2016/0103667 A1 | 4/2016 | Chen et al. | |
| 2016/0247239 A1* | 8/2016 | Houseworth | G06Q 40/123 |
| 2017/0090893 A1 | 3/2017 | Aditya et al. | |
| 2017/0178199 A1 | 6/2017 | Cessna et al. | |
| 2017/0186097 A1 | 6/2017 | Mascaro et al. | |
| 2017/0200087 A1 | 7/2017 | Mascaro et al. | |
| 2017/0300933 A1 | 10/2017 | Mascaro et al. | |
| 2017/0308960 A1 | 10/2017 | Mascaro et al. | |

* cited by examiner

| FALSE NEGATIVE RATE | FALSE POSITIVE RATE | FALSE NEGATIVE (FN) WRONGLY IDENTIFIED AS STANDARD | TRUE NEGATIVE (TN) CORRECTLY IDENTIFIED AS STANDARD | TRUE POSITIVE (TP) CORRECTIVELY IDENTIFIED AS ITEMIZED | FALSE POSITIVE (FP) WRONGLY IDENTIFIED AS ITEMIZED | ACCURACY |
|---|---|---|---|---|---|---|
| FN/(FN+TP) | FP/(FP+TN) | | | | | TN+TP |
| 0.04 | 0.26 | 0.32M | 14.75M | 8.19M | 5.25M | 22.9M |
| 0.06 | 0.20 | 0.465M | 16M | 7.96M | 4.1M | 24.0M |
| 0.08 | 0.15 | 0.7M | 17.05M | 7.8M | 2.95M | 24.9M |
| 0.11 | 0.10 | 0.96M | 18M | 7.4M | 2M | 25.4M |

METHOD AND SYSTEM FOR IDENTIFYING USERS WHO BENEFIT FROM FILING ITEMIZED DEDUCTIONS TO REDUCE AN AVERAGE TIME CONSUMED FOR USERS PREPARING TAX RETURNS WITH A TAX RETURN PREPARATION SYSTEM

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems often present a fixed, e.g., predetermined and pre-packaged, structure or sequence of questions to all users as part of the tax return preparation interview process. This is largely due to the fact that the traditional tax return preparation system analytics use a sequence of interview questions, and/or other user experiences, that are static features and that are typically hard-coded elements of the tax return preparation system and do not lend themselves to effective or efficient modification. As a result, the user experience, and any analysis associated with the interview process and user experience, is a largely inflexible component of a given version of the tax return preparation system. Consequently, the interview processes and/or the user experience of traditional tax return preparation systems can only be modified through a redeployment of the tax return preparation system itself. Therefore, there is little or no opportunity for any analytics associated with the interview process, and/or user experience, to evolve to meet a changing situation or the particular needs of a given taxpayer, even as more information about that taxpayer, and their particular circumstances, is obtained.

As an example, using traditional tax return preparation systems, the sequence of questions, and the other user experience elements, presented to a user is pre-determined based on a generic user model that is, in fact and by design, not accurately representative of any "real world" user. Consequently, irrelevant, and often confusing, interview questions are virtually always presented to any given real world user. It is therefore not surprising that many users, if not all users, of these traditional tax return preparation systems experience, at best, an impersonal, unnecessarily long, confusing, and complicated, interview process and user experience. Clearly, this is not the type of impression that results in happy, loyal, repeat customers.

Even worse is the fact that, in many cases, the hard-coded and static analysis features associated with traditional tax return preparation systems, and the resulting presentation of irrelevant questioning and user experiences, leads potential users of traditional tax return preparation systems, i.e., potential customers, to believe that the tax return preparation system is not applicable to them, and perhaps is unable to meet their specific needs. In other cases, the users simply become frustrated with these irrelevant lines of questioning and other user experience elements. Many of these potential users and customers then simply abandon the process and the tax return preparation systems completely, i.e., never become paying customers. Furthermore, the potential customers do not become proponents for the tax return preparation systems (e.g., by promoting the product to their friends and family), and may instead become opponents to the tax return preparation systems (e.g., by recommending against the use of the systems). Clearly, this is an undesirable result for both the potential user of the tax return preparation system and the provider of the tax return preparation system.

What is needed is a method and system for applying analytics models to a tax return preparation system to identify users who benefit from filing itemized deductions and to reduce an average time consumed for users preparing tax returns with the tax return preparation system.

SUMMARY

Embodiments of the present disclosure address some of the shortcomings associated with traditional tax return preparation systems by applying one or more analytics models to a tax return preparation system to identify users who benefit from filing itemized deductions and to reduce an average time consumed for users preparing tax returns with the tax return preparation system. The Inventors determined that in recent years, users spend an average of 14 minutes answering questions that are related to itemized deductions, during a tax return preparation interview. Unfortunately, many of these users are unnecessarily subjected to the 14 minutes (on average) of receiving, reviewing, and answering itemized deduction tax questions because many of these users may reduce their taxable income by electing the standardized deduction, instead of using an itemized deduction. As a result, the users who receive greater benefit from electing the standardized deduction are exposed to questions that may not apply to them and that, more importantly, may actually be cause for confusion for the users. Even worse is the fact that some users do not even qualify to file an itemized deduction (in their state and/or federal filing), yet those same users are subjected to rotely prepared and presented tax return questions of traditional tax return preparation systems. The tax return preparation system disclosed herein receives user data, applies the user data to a predictive model to enable the predictive model to determine a likelihood of the user benefiting from an itemized deduction, and the tax return preparation system skips, omits, postpones, delays, deprioritizes, reorders, and/or re-ranks the irrelevant itemized deduction tax questions for users who are less likely or who are unlikely to benefit from itemizing their deductions, according to one embodiment. Although an average of 14 minutes per user may seem like an insignificant quantity of time to save, since tens of millions of users prepare and file their tax returns each tax season, an average of 14 minutes per user can accumulate to a savings of tens of thousands of user hours and machine processing hours.

The tax return preparation system uses different predictive models for different user characteristics, according to one embodiment. For example, the tax return preparation system can use a different model for first-time users than for returning users, can use a different model for early tax season tax return filers than for late tax season tax return filers, and so forth. Each of the predictive models can be trained using specific existing tax return data from one or more previous seasons to dial-in/optimize the predictive models for particular groups, sets, or characteristics of tax filers, according to one embodiment.

The tax return preparation system applies one or more thresholds to the predictive models, or to the output of the predictive models, so that the tax return preparation system operates around a particular, predetermined, or desired operating characteristic of the predictive model, according to one embodiment. For example, when the output of a predictive model is greater than a first threshold, the tax return preparation system determines that a user is highly likely to benefit from filing an itemized deduction, and when the output of the predictive model is less than a second threshold, the tax return preparation system determines that the user is highly likely to benefit from filing a standardized deduction. By adjusting the one or more thresholds employed by the tax return preparation system, the tax return preparation system can manipulate the quantity of true positives, false positives, false negatives, and true negatives that result from predicting the likelihood that users will reduce their taxable income with an itemized or standardized deduction. These and other embodiments are discussed in more detail hereafter.

By applying analytics models to a tax return preparation system to identify users who benefit from filing itemized deductions and to reduce an average time consumed for users preparing tax returns with a tax return preparation system, implementation of embodiments of the present disclosure allows for significant improvement to the fields of user experience, electronic tax return preparation, data collection, and data processing, according to one embodiment. As one illustrative example, by skipping or postponing one or more of the tax questions that otherwise extend the tax return preparation interview (without financial gain to the user), embodiments of the present disclosure allows for progressing a user through a tax return preparation session with fewer processing cycles and less communications bandwidth. When tax questions for itemized deductions are skipped, the system can provide the user with an option of reviewing the skipped questions near the end of the tax deduction section or near the end of the tax return preparation interview. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by selectively presenting itemized deduction questions to a user when the user financially benefits from an itemized deduction, the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

BRIEF DESCRIPTION OF THE DRAWINGS

FIG. 4 is a chart of performance metrics for an example predictive model of the software architecture of FIG. 1, according to one embodiment

Figure 1:
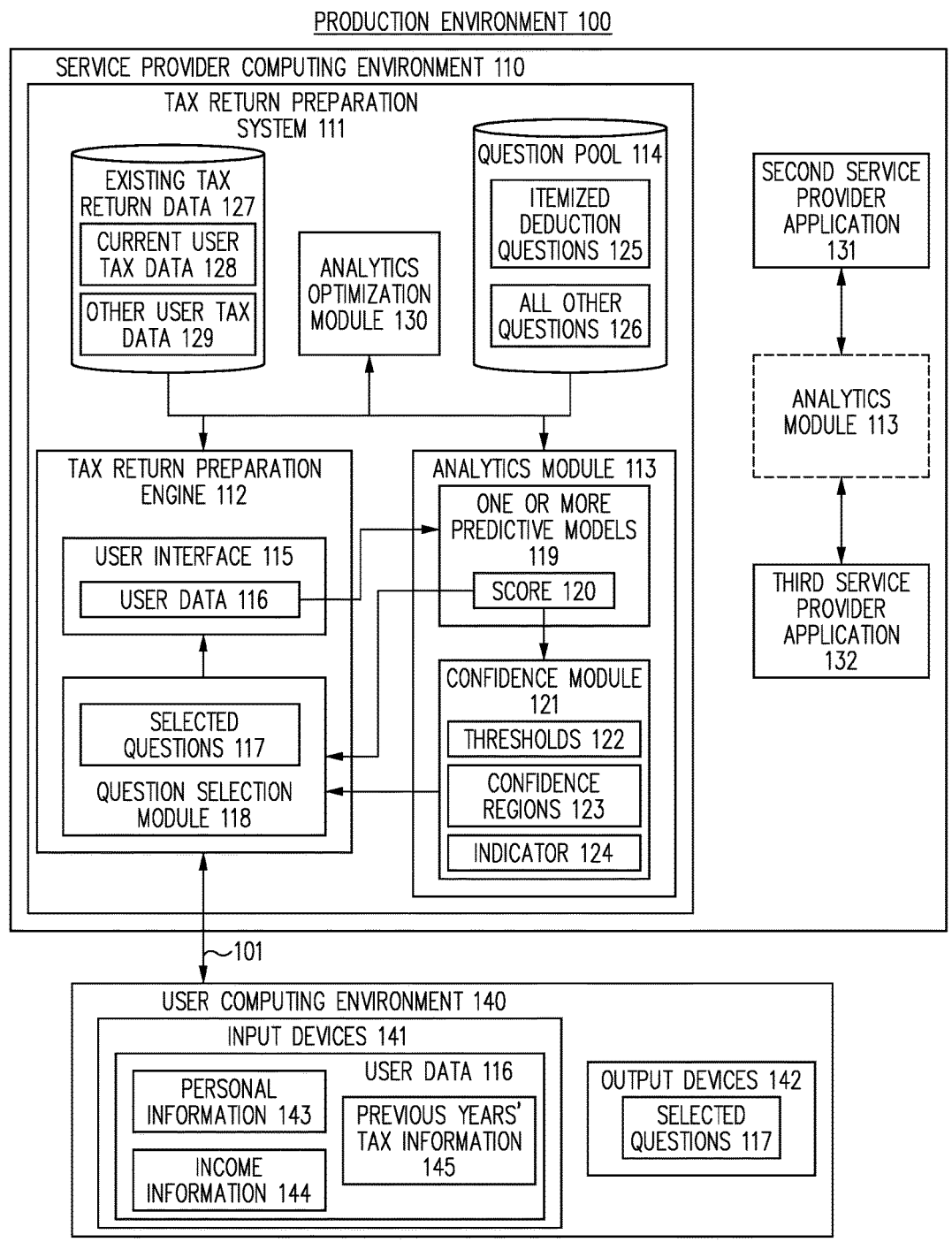
FIG. 1 is a block diagram of software architecture for identifying users who are likely to reduce their taxable income more with an itemized deduction than with a standardized deduction, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for applying analytics models (e.g., predictive models) to questions within a tax return preparation system to determine personalize questions presented to a user to reduce the likelihood of the user abandoning the tax return preparation process, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer (SSL) communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "user experience" includes not only the interview process, interview process questioning, and interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Hardware Architecture

FIG. 1 illustrates a block diagram of a production environment 100 for applying one or more analytics models to a tax return preparation system to identify users who benefit from filing itemized deductions and to reduce an average time consumed by users preparing tax returns with the tax return preparation system. The Inventors determined that in recent years, users spend an average of 14 minutes answering questions that are related to itemized deductions, during a tax return preparation interview. Unfortunately, many of these users are unnecessarily subjected to the 14 minutes (on average) of receiving, reviewing, and answering itemized deduction tax questions because many of these users can reduce their taxable income by electing the standardized deduction, than by using an itemized deduction. As result, the users who receive greater benefit from electing the standardized deduction are exposed to questions that may not apply to them and that, more importantly, may actually be cause for confusion for the users. Even worse is the fact that some users do not even qualify to file an itemized deduction (in their state and/or federal filing), yet those same users are subjected to rotely prepared and presented tax return questions of traditional tax return preparation systems. The tax return preparation system disclosed herein receives user data, applies the user data to a predictive model to enable the predictive model to determine a likelihood of the user benefiting from an itemized deduction, and the tax return preparation system skips, omits, deemphasizes, reorders, re-ranks, and/or postpones the irrelevant itemized deduction tax questions for users who are less likely or who are unlikely to benefit from itemizing their deductions, according to one embodiment. These and additional embodiments are disclosed in more detail below.

By applying analytics models to a tax return preparation system to identify users who benefit from filing itemized deductions and to reduce an average time consumed for users preparing tax returns with a tax return preparation system, implementation of embodiments of the present disclosure allows for significant improvement to the fields of user experience, electronic tax return preparation, data collection, and data processing, according to one embodiment. As one illustrative example, by selectively skipping or postponing tax questions that otherwise extend the tax return preparation interview (without financial gain to the user), embodiments of the present disclosure allows for progressing a user through a tax return preparation session with fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by selectively presenting itemized deduction questions to a user when the user financially benefits from an itemized deduction, the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

The production environment 100 includes a service provider computing environment 110 and a user computing environment 140 for identifying users who are likely to reduce their taxable income more with an itemized deduction than with a standardized deduction, according to one embodiment. The computing environments 110 and 140 are communicatively coupled to each other with a communication channel 101, according to one embodiment.

The service provider computing environment 110 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment. The one or more applications can include, but are not limited to tax return preparation systems, other financial management systems, and applications that support the tax return preparation systems and/or the other financial management systems, according to one embodiment. The service provider computing environment 110 includes a tax return preparation system 111 that utilizes one or more predictive models to determine a likelihood of a user benefiting from itemizing his/her deductions, so that the tax return preparation system 111 can omit, skip, postpone, and/or re-rank tax questions related to itemizing deductions if it will be financially advantageous for the user to elect a standardized deduction over an itemized deduction, according to one embodiment. By identifying users who are likely to benefit from itemizing their deductions and by identifying users who are likely to benefit from standardizing their deductions, the tax return preparation system 111 can reduce the amount of time users spend in tax return preparation interviews by partially or wholly skipping over the questions that are presented merely for the purpose of assisting a user in itemizing his/her deductions. When applied to millions of users per tax season, the time saved by partially or wholly skipping over itemized deduction questions, it is estimated that tax return preparation interview hours can be reduced tens of thousands of hours each tax season, saving users time and confusion and saving service providers costs associated with running and maintaining computing systems. The tax return preparation system 111 includes various components, databases, engines, modules, and data to support identifying users who are likely to benefit from itemizing or standardizing their tax return deductions, according to one embodiment. The tax return preparation system 111 includes a tax return preparation engine 112, an analytics module 113, and a question pool 114, according to one embodiment.

The tax return preparation engine 112 guides the user through the tax return preparation process by presenting the user with questions, according to one embodiment. The tax return preparation process includes progressing a user through a tax return preparation interview. The tax return preparation interview can be broken into multiple tax return preparation sessions, during which the user accesses or "logs into" the tax return preparation system 111, according to one embodiment. A user may access or login to the tax return preparation system 111 multiple times, e.g., in multiple sessions, to complete a tax return preparation interview. At the end of a tax return preparation interview, the tax return preparation system 111 files a federal tax return, and may file one or more state tax returns (as needed), in response to receiving instructions from the user to do so, according to one embodiment. Thus, the tax return preparation process can include, but is not limited to: completing a tax return preparation interview to enable the tax return preparation system 111 to complete/prepare a tax return for the user, and filing one or more federal and state tax returns, according to one embodiment. The completion and filing of the one or more federal and state tax returns are processed over one or more tax return preparation sessions, in which the user accesses or logs into the tax return preparation system 111, according to one embodiment.

The tax return preparation engine 112 includes a user interface 115 to gather and receive user data 116 from the user and to present selected questions 117 to the user, to progress the user through the tax return preparation process, according to one embodiment. The user interface 115 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the user data 116 from the user, according to one embodiment.

The tax return preparation engine 112 employs the user interface 115 to receive the user data 116 from input devices 141 of the user computing environment 140 and employs the user interface 115 to transmit the selected questions 117 to output devices 142 of the user computing environment 140, according to one embodiment. The input devices 141 include, but are not limited to, touchscreens, mice, keyboards, microphones, cameras, touchpads, and the like, and are configured to receive various types of user data 116, according to one embodiment. For example, the input devices 141 gather user data 116 such as personal information 143, income information 144, and previous years' tax information 145, according to one embodiment. The user data 116 can also include user responses to the selected questions 117 that are presented to the user by the tax return preparation system 111. The output devices 142 include, but are not limited to, monitors, speakers, touchscreens, and the like, according to one embodiment. The output devices 142 display/present the selected questions 117 and various user interface elements to the user, as provided by the tax return preparation system 111, according to one embodiment.

The user data 116 received by the user interface 115 represents both the information that is obtained from the user through the user computing environment 140, as well as information that is obtained from other sources, according to one embodiment. For example, the user data 116 can include information from existing tax return data 119, such as one or more previous years' tax return data for a particular user. The existing tax return data 119 is stored in a data store, a database, and/or a data structure, according to one embodiment. The user data 116 can also include information that the tax return preparation system gathers directly from one or more external sources such as, but not limited to, a payroll management company, state agencies, federal agencies, employers, military records, public records, private companies, and the like, according to one embodiment. More particular examples of the user data 116 include, but are not limited to, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system or in the preparation of a user's tax return, according to various embodiments. In some implementations, the user data 116 is a subset of all of the user information used by the tax return preparation system 111 to prepare the user's tax return, e.g., is limited to marital status, children's information, and annual income. The personal information 143 and the income information 144 of the user data can be limited to a subset of the user data 116 which may include, but not be limited to, an age of the user, an age of a spouse of the user, a zip code, a tax return filing status, state income, a home ownership status, a home rental status, a retirement status, a student status, an occupation of the user, an occupation of a spouse of the user, whether the user is claimed as a dependent, whether a spouse of the user is claimed as a dependent, whether another taxpayer is capable of claiming the user as a dependent, whether a spouse of the user is capable of being claimed as a dependent, salary and wages, taxable interest income, ordinary dividend income, qualified dividend income, business income, farm income, capital gains income, taxable pension income, pension income amount, IRA distributions, unemployment compensation, taxable IRA, taxable Social Security income, amount of Social Security income, amount of local state taxes paid, whether the user filed a previous years' federal itemized deduction, whether the user filed a previous years' state itemized deduction, number of dependents, and whether the user is a returning user to the tax return preparation system.

The user data 116 can also include browsing behavior data that is obtained from the user's interaction with the user interface 115 of the tax return preparation system 111, and can also include information obtained from Internet advertising companies, public records servers, social media servers, and the like, according to one embodiment. The user data 116 can dynamically change as the user enters additional information, so the tax return preparation engine 112 can be configured to periodically or continuously receives, update, and transmit the user data 116 to the analytics module 113 to enable the analytics module 113 to continuously update the likelihood that a user should file his/her return with an itemized or standardized deduction. Periodically or continuously providing user data 116 to the analytics module 113 also enables the tax return preparation system to personalize and reduce the duration of the tax return preparation process by determining which questions from the question pool 114 are applicable to assisting a user in efficiently filing his/her tax return with the tax return preparation system 111, according to one embodiment. The question pool 114 includes a data store, a database, and/or some type of data structure to store the questions, according to one embodiment.

The tax return preparation engine 112 presents selected questions 117 based on scores, indicators, or levels of confidence that are generated or provided by the analytics module 113, according to one embodiment. For example, when one or more of the predictive models within the analytics module 113 provides a score that is indicative of the likelihood that a user will benefit more from an itemized or standardized deduction, the tax return preparation system 111 determines the selected questions 117 from the question pool 114 in order to reduce itemized deduction questions provided to users who are unlikely to benefit from itemizing deductions for their tax returns, according to one embodiment. The tax return preparation engine 112 includes a question selection module 118 for at least partially determining whether to include itemized deduction questions and/or how many itemized deduction questions to include in the selected questions 117, according to one embodiment. The question selection module 118 is configured to receive a score, an indicator, and/or a level of confidence from the analytics module 113 and/or from one or more of the predictive models within the analytics module, from which the question selection module 118 determines how many (if any), itemized deduction questions to include in the selected questions 117 that are provided to the user.

The analytics module 113 receives user data and determines the likelihood that the user will reduce his/her tax return by itemizing deductions or by electing a standardized deduction, according to one embodiment. The analytics module 113 includes one or more predictive models 119 for determining a likelihood that a user will reduce his/her taxable income by itemizing deductions or by electing a standardized deduction, according to one embodiment. The one or more predictive models 119 receive user data 116, which includes the personal information 143, the income information 144, and/or the previous years' tax information 145, according to one embodiment. Using this data, the one or more predictive models 119 generate a score 120 that is from 0 to 1, i.e., that is no less than 0 and no greater than 1, according to one embodiment. The score 120 is a floating-point number that represents the likelihood or probability that a particular user is likely to reduce his/her tax return by itemizing deductions. The closer the score 120 is to 1, the higher the likelihood/probability/certainty is that the user will financially benefit from itemizing his/her deductions to lower his/her taxable income more than electing a standardized deduction, according to one embodiment. The closer the score 120 is to 0, the higher the likelihood/probability/certainty is that the user will financially benefit from electing a standardized deduction to lower his/her taxable income more than by itemizing his/her deductions, according to one embodiment.

The one or more predictive models 119 can include multiple predictive models, which can each be trained to serve a different group, class, type, and/or characteristic of tax filer, according to one embodiment. For example, the one or more predictive models 119 can include at least 6 different predictive models, trained for different scenarios. In one embodiment, a first predictive model is for first-time users, a second predictive model is for returning users to the tax return preparation system 111, a third predictive model is for users who file during a first peak of the tax filing season (e.g., between February $1^{st}$-March 15), a fourth predictive model is for users who file during a second peak of the tax filing season (e.g., between March $15^{th}$-April $30^{th}$), a fifth predictive model is for first-time users who file after April, and a sixth predictive model is for returning users who file after April. Of course, additional predictive models that are trained for additional scenarios can also be included in the analytics module 113 to provide a more specialized analysis of the user data 116 and to more particularly determine the likelihood that a user will have a lower taxable income by itemizing his/her deductions, according to one embodiment. Notably, users who file earlier in the tax filing season are more likely to receive money from filing their tax returns, are more likely to have relatively easy to prepare tax returns, and are more likely to have W-2s to file. By contrast, users who file later in the tax filing season are more likely to owe additional taxes, are more likely to have more complex tax returns, are more likely to be procrastinators, and are more likely to have 1099 income and other types of income. Accordingly, users can be categorized/grouped based on not only their income characteristics but also by their tax return filing characteristics, configuring the analytics module 113 to use one or more predictive models 119 to analyze the user data 116 can be used to generate a more accurate prediction of the likelihood that the user will benefit from itemizing deductions or from electing a standardized deduction, according to one embodiment. As a result, some of the predictive models 119 may provide more accurate results than others. For example, a returning user will have information that is indicative of whether the user itemized deductions the previous year. Along with a user's number of exemptions and W-2 or 1099 Misc information, whether a user itemized deductions in a previous year is a very strong indicator/predictor of whether a user will benefit from itemizing deductions in the current year. In other words, whether the user itemized deductions that a previous year, W-2/1099 Misc information, and a user's number of exemptions are dominant/strong features for predicting/determining whether a user is likely to benefit from itemizing his/her deductions, according to one embodiment. For new users, the tax return preparation system may not have data that is indicative of the user's previous tax filings, so whether the user itemized deductions a previous year may not be available to the tax return preparation system 111 and to the analytics module 113. Therefore, for new users, the dominant/strong features for predicting/determining whether a user is likely to benefit from itemizing his/her did actions includes W-2/1099 Misc information and the user's number of exemptions, according to one embodiment.

The analytics module 113 uses one or more techniques for analyzing the score 120, according to one embodiment. The analytics module 113 includes a confidence module 121 for analyzing the score 120, according to one embodiment. The confidence module 121 receives the score 120, and compares the score 120 to one or more thresholds 122. The thresholds 122 can be implemented as a single threshold, can be implemented as two thresholds, or can be implemented as multiple thresholds, in order to find one or more confidence regions 123, according to one embodiment. For example, the thresholds 122 can include a first threshold, e.g., 0.8, which when the score 120 exceeds the first threshold, the confidence module 121 provides an indicator 124 that the user is highly likely to benefit from itemizing deductions. In one embodiment, the indicator 124 is a flag, such as an "itemize deductions" flag. As another example, the threshold 122 can include a second threshold, e.g., 0.5, which when the score 120 is below the second threshold, the confidence module 121 provides an indicator 124 that the user is highly likely to benefit from electing standardized deductions. In one embodiment, the indicator 124 is a flag, such as a "select standardized deductions" flag. In one embodiment, the confidence module 121 outputs the score 120 and one or more indicators 124 to the tax return preparation engine 112, to enable the tax return preparation engine 112 to make suggestions or recommendations to the user to itemize deductions or to wait until the end of the tax return preparation interview to review the itemized deductions questions, according to one embodiment.

Figure 2:
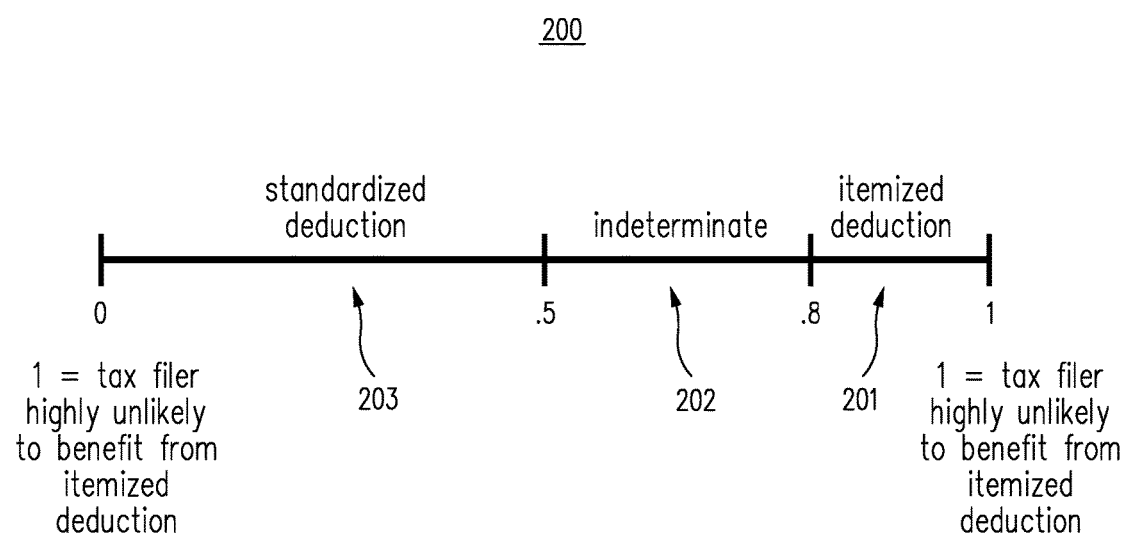
FIG. 2 is a block diagram of a score graph which illustrates multiple levels of confidence levels that may be generated by an analytics module in a tax return preparation system, in accordance with one embodiment.

FIG. 2 illustrates a confidence graph 200 which illustrates multiple levels of confidence that may be determined by the confidence module 121, according to one embodiment. The confidence module 121 can be configured to apply the thresholds 122 to the score 120 to find multiple confidence regions 123. The confidence regions 123 can include, for example, itemize deduction region 201, an indeterminate region 202, and a standardized deduction region 203, according to one embodiment. In one embodiment, a score 120 of 0.8 and greater separates the itemized deduction region 201 from the indeterminate region 202. In one embodiment, a score 120 of 0.5 and below separates the standardized deduction region 203 from the indeterminate region 202. As illustrated, a score 120 of 1 indicates that the tax filer is highly likely to benefit from an itemized deduction, and a score 120 of 0 indicates that the tax filer is highly unlikely to benefit from an itemized deduction, according to one embodiment. Although examples of thresholds of 0.8 and 0.5 are illustrated, these example thresholds are not meant to be limiting and are only provided as example implementations/embodiments of thresholds.

The question selection module 118 is configured to populate the selected questions 117 from the question pool 114 at least partially based on the score 120, the confidence regions 123, and/or the indicator 124 received from the one or more predictive models 119, the confidence module 121, and/or the analytics module 113, according to one embodiment. For example, the question selection module 118 can be configured to insert the itemized deduction questions 125 into the selected questions 117 for presentation to the user, when the confidence module 121 or the analytics module 113 provides an indicator 124 or a score 120 that is indicative of a high likelihood that the user will benefit from itemizing his/her deductions (i.e., more than electing a standardized deduction). In one embodiment, the question selection module 118 populates the selected questions 117 with the itemized deduction questions 125 when the score 120 or the confidence regions 123 correspond with the itemized deduction region 201 (of FIG. 2). In one embodiment, the question selection module 118 sparingly, strategically, tactically populates the selected questions 117 with the itemized deduction questions 125 when the score 120 or the confidence regions 123 correspond with the indeterminate region 202 (of FIG. 2). In one embodiment, the question selection module 118 populates the selected questions 117 with the all other questions 126 and skips or postpones presentation of the itemized deduction questions 125 where the score 120 or the confidence regions 123 correspond with the standardized deduction region 203 (of FIG. 2). When tax questions for itemized deductions are skipped, the system can provide the user with an option of reviewing the skipped questions near the end of the tax deduction section or near the end of the tax return preparation interview so that if the user believed itemized deduction questions are relevant to the user, the user can optionally review and respond to the itemized deduction questions, according to one embodiment. In one embodiment, the tax return preparation system 111 ranks the relevancy of all of the questions in the question pool 114 and the questions are re-ranked and reordered during the tax return preparation interview. The reordering and re-ranking of the question may include moving less relevant or irrelevant question to an optional section to allow the user to have the option of reviewing those questions although the tax return preparation system 111 has determined that those questions are not relevant to the user's situation. Although the question selection module 118 is illustrated as being incorporated in the tax return preparation engine 112, in alternative embodiments, the question selection module 118 is configured to operate independently of the tax return preparation engine 112, according to one embodiment.

The tax return preparation system 111 uses the output of the analytics module 113 to rank or prioritize the order in which tax topics are presented to the user during the tax return preparation interview, according to one embodiment. The tax return preparation system 111 can use the question selection module 118 or some other component to determine and prioritize a number of tax topics for the user, based on relevance to the user, based on the score 120, and/or based on the output of the confidence module 121 (e.g., the confidence regions 123 and/or the indicator 124). By ranking the tax topics for the user, based on the one or more predictive models 119 (or based on the analytics module 113), the tax return preparation system 111 can be configured to present more relevant tax topics (e.g., through tax questions) to the user and postpone the presentation of less relevant tax topics, so that the user feels like the system is customized and catering to the particular user's situation and needs, according to one embodiment.

The service provider computing environment 110 trains the one or more predictive models 119 using existing tax return data 127, according to one embodiment. The existing tax return data 127 includes current user tax data 128 and other user tax data 129, according to one embodiment. The existing tax return data 127 includes tax data collected from previous years' tax return filings and/or includes tax data collected from a current year by users who have partially or completely prepared their tax returns using the tax return preparation system 111, according to one embodiment. The one or more predictive models 119 are trained using one or more of a variety of machine learning techniques including, but not limited to, regression, logistic regression, decision trees, artificial neural networks, support vector machines, linear regression, nearest neighbor methods, distance based methods, naive Bayes, linear discriminant analysis, k-nearest neighbor algorithm, or another mathematical, statistical, logical, or relational algorithm to determine correlations or other relationships between the user data (e.g., personal information, income information, tax filing timing, etc.) and whether users filed itemized deductions. In other words, the one or more predictive models 119 are trained using existing inputs and outputs for the predictive models that are stored in the existing tax return data 127.

The analytics module 113 is illustrated and described as being incorporated in the tax return preparation system 111, but in alternative embodiments, the analytics module 113 is implemented independently of the tax return preparation system within the service provider computing environment 110. The analytics module 113 is optionally hosted on a different server, a different computing system, a different virtual device and/or as a different application than the tax return preparation system 111, according to one embodiment. The analytics module 113, when implemented externally to the tax return preparation system 111, receives the user data 116 from the tax return preparation system 111 over one or more networks and returns the score 120, the confidence regions 123, and/or the indicator 124 to the tax return preparation system 111 to enable the tax return preparation system 111 to select appropriate questions for presentation to the user, based on the likelihood that the user will financially benefit from itemizing or standardizing his/her deductions with his/her tax filing, according to one embodiment. In one embodiment, a second service provider application 131 and/or a third service provider application 132 also use the services of the analytics module 113, and the analytics module 113 is modularized to enable exchanging, updating, and/or replacing one or more of the one or more predictive models 119 without interrupting or without changing the applications hosted by the service provider computing environment 110 (e.g., the tax return preparation system 111).

The tax return preparation system 111 includes an analytics optimization module 130 for periodically updating and/or training the one or more predictive models 119 during use (e.g., during a current tax return preparation season), according to one embodiment. The analytics optimization module 130 monitors the accuracy of the analytics module 113 by comparing the predictions of the one or more predictive models 119 with the actual final selection made by the user (or made by the tax return preparation system 111) regarding whether the user should file his/her tax return using an itemized deduction or a standardized deduction. The analytics optimization module 130 is configured to adjust the thresholds 122 so that the tax return preparation system 111 provides itemized or standardized deduction recommendations within the tolerances for error and accuracy that have been defined for the system. Operating points, false positive rates, and false negative rates for the predictive model are discussed below. However, according to one embodiment, the analytics optimization module 130 periodically (e.g., hourly, daily, weekly, biweekly, monthly, quarterly, etc.) adjusts one or more of the thresholds 122 for the score 120 to tune or manipulate the false positive rates and/or the false negative rates to be near one or more particular operating points.

Figure 3:
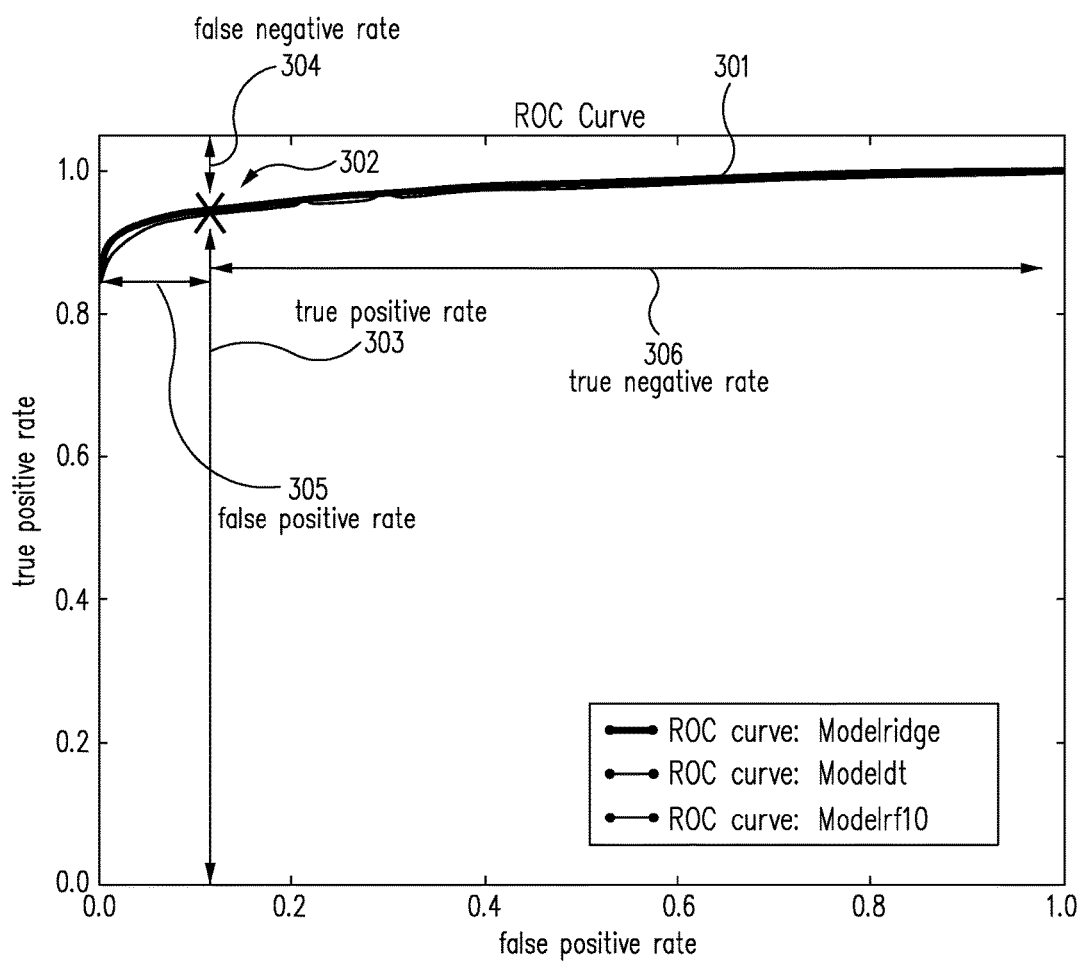
FIG. 3 is a diagram of a performance graph for one or more predictive models of the software architecture of FIG. 1, according to one embodiment

FIG. 3 illustrates a performance diagram 300 for one of the one or more predictive models 119, according to one embodiment. The performance diagram 300 is a receiver operation characteristics ("ROC") curve 301 which maps a true positive rate against a false positive rate for the predictive model. For a selected operating point 302 on the ROC curve 301, a single true positive rate 303 and false negative rate 304 correspond with a single false positive rate 305 and true negative rate 306. As shown, the sum of the true positive rate 303 and the false negative rate 304 equal 1 and the sum of the false positive rate and the true negative rate equal 1. As an example of a tolerance for error and/or accuracy that can be defined for a system, the operating point 302 can be defined in terms of the false negative rate 304, the true positive rate 303, the false positive rate 305, and/or the true negative rate 306. In one embodiment, an operating point 302 such as a 0.05 false negative rate 304 and a 0.1 false positive rate 305 is selected as a selected operating point 302 for the system. As illustrated, the smaller the false negative rate 304 becomes, the larger the false positive rate 305 becomes, and vice versa. Therefore, attempts to make the false negative rate 304 smaller (i.e., making the true positive rate 303 larger) results in a larger false positive rate 305 (i.e. a smaller true negative rate 306). These rates are illustrated, defined and described in FIG. 4 and the corresponding discussion, hereafter. However, it is to be noted, that in one embodiment, the analytics optimization module 130 calculates and monitors one or more of the true positive rate 303, the false negative rate 304, the false positive rate 305, and the true negative rate 306 to determine whether the tax return preparation system 111 is operating at the defined or desired operating point 302, according to one embodiment. The ROC curve 301 can model the performance of the predictive models 119 using a variety of algorithms such as, but not limited to, ridge linear regressor, decision tree, extra tree, and random forest, according to various embodiments.

FIG. 4 illustrates an example of a performance chart 400 for various performance metrics of an example predictive model (e.g., the one or more predictive models 119), according to one embodiment. The columns of the performance chart 400 include a false negative rate, a false positive rate, a false negative ("FN"), a true negative ("TN"), a true positive ("TP"), a false positive ("FP"), and accuracy. Each column also indicates how each metric is defined. Prior to defining each of the metrics, a brief reference is made to the confusion matrix of Table 1.

TABLE 1

|  |  | Actual | |
| --- | --- | --- | --- |
|  |  | Itemized | Standardized |
| Predicted | Itemized | TP | FP |
|  | Standardized | FN | TN |
|  |  | total P | total N |

The confusion matrix of Table 1 is a table with two rows and two columns, which reports the number of true positives, false positives, false negatives, and true negatives. In one embodiment, users who use itemized deductions are positives and users who use standardized deductions are negatives. A true positive, for the present disclosure, is a user who is correctly identified/classified as benefiting more from an itemized deduction than from a standardized deduction. A person identified as a true positive does not receive much benefit from the predictive model because that user goes through the itemized deduction questions to prepare the user's itemized deduction. A false positive is a user who is incorrectly identified/classified as benefiting more from an itemized deduction. A person identified as a false positive is a person who could have received the benefit of a shorter tax return preparation interview, but the person was incorrectly identified as needing to review and respond to the questions associated with the itemized deduction. Therefore, the false positives and the false positive rate are metrics that indicate inefficiencies in the predictive model. A false negative is a user who is incorrectly identified/classified as benefiting more from a standard deduction. If the tax return preparation system 111 does not catch this error later in the interview then this user has the potential of filing a tax return for a slightly higher income than was necessary. In practice, the tax return preparation system 111 will most likely eventually identify these users as needing to review and respond to the itemized deduction questions as the predictive models continue to evaluate these users' inputs throughout a tax return preparation interview. Because the one or more predictive models 119 periodically or continuously reevaluate the scores assigned to a particular user, as more information is provided to the tax return preparation system 111, the one or more predictive models 119 can be configured to eventually identify the false negative users so that these misclassified users do not forfeit potential returned income (or pay too much in taxes). A true negative is a user who is correctly identified/classified as benefiting more from a standard deduction. These users obtain the greatest benefit because the earlier the predictive models identify these users, the fewer itemized deduction questions these users will receive, review, and answer. The Inventors have estimated that in some years an average of 14 minutes per user is spent reviewing and answering itemized deduction questions. As shown in the performance chart 400, if the false negative rate is adjusted from 0.05 to 0.11, 3.25 million users of the sample set for the performance chart 400 would have been able to avoid an average of 14 minutes a person by skipping the itemized deduction questions. 14 minutes multiplied by 3.25 million users is approximately 75,000 user-hours that could have been avoided, in addition to equipment costs associated with powering, cooling, maintaining, and electronically communicating with the computing systems that host the tax return preparation systems. The down-side of adjusting the false negative rate from 0.05 to 0.11 is that the false negative count increases by 640,000 people, each with a small potential of overpaying taxes or receiving a longer tax return preparation interview because the itemized deduction questions would need to be added to the end of the interview for the user. Although the predictive model appears to be performing a similar function as compliance operations (which ensure and double check that users are correctly filing), other parts/functions of the tax return preparation system 111 that are not specifically disclosed herein are configured to take care of compliance operations/regulations. The disclosed embodiments of the predictive models are configured to reduce the amount of time spent by the average user by omitting and/or skipping at least part of the itemized deduction questions for users who can be identified as more likely to benefit from electing standardized deductions instead of filing itemized deductions.

With reference to the performance chart 400 and Table 1, the false negative rate is defined as:

$$\text{FALSE NEGATIVE RATE} = FN/(FN+TP), \text{ and}$$

the false positive rate is defined as:

$$\text{FALSE POSITIVE RATE} = FP/(FP+TN).$$

The false positive rate (also called a false alarm rate) is a performance metric of the predictive model and is the rate with which the model incorrectly classifies people as benefiting more from an itemized deduction even though they could have skipped the itemized deduction questions because they actually benefited more from a standardized deduction. The false negative rate (also called the miss rate) is a performance metric of the predictive model and is the rate with which the model incorrectly classifies people as not benefiting more from an itemized deduction even though they could obtain greater benefit (e.g., pay less taxes or receive tax money back) by filing an itemized deduction. The false negative rate is one predictive model performance metric by which the operating point of the tax return preparation system can be set (e.g., <=0.05), according to one embodiment, to reduce the liability or negative impact of miss classifying users in such a way that they have the potential of paying more taxes than legally obligated.

By applying analytics models to a tax return preparation system to identify users who benefit from filing itemized deductions and to reduce an average time consumed for users preparing tax returns with a tax return preparation system, implementation of embodiments of the present disclosure allows for significant improvement to the fields of user experience, electronic tax return preparation, data collection, and data processing, according to one embodiment. As one illustrative example, by postponing, deprioritizing, or skipping tax questions that otherwise extend the tax return preparation interview (without financial gain to the user), embodiments of the present disclosure allows for progressing a user through a tax return preparation session with fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by selectively presenting itemized deduction questions to a user when the user financially benefits from an itemized deduction, the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

Process

Figure 5:
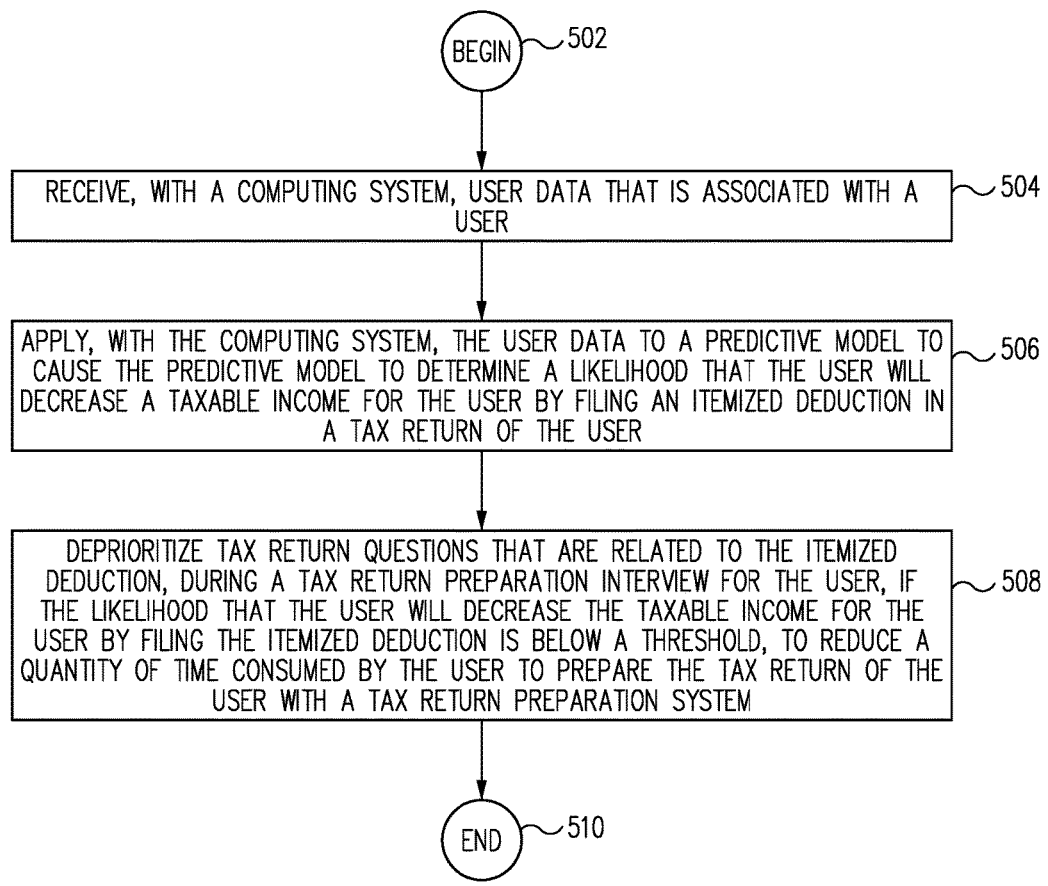
FIG. 5 is a flow diagram for identifying users who benefit from filing itemized deductions to reduce an average time consumed for users preparing tax returns with a tax return preparation system, in accordance with one embodiment.

FIG. 5 illustrates a flow diagram of a process 500 for identifying users who benefit from filing itemized deductions to reduce an average time consumed for users preparing tax returns with a tax return preparation system, according to various embodiments.

At operation 502, the process begins.

At operation 504, the process receives, with a computing system, user data that is associated with a user, according to one embodiment. If the user is a new user, the user data includes personal information about the user and income information about the user. If the user is a returning user, the user data includes, but is not limited to, personal information about the user, income information about the user, and whether or not the user itemized his/her deductions in one or more previous tax years, according to one embodiment. Other user data can also be received and applied to predictive models to further improve the results of the predictive models' analysis of the user's data.

At operation 506, the process applies, with the computing system, the user data to a predictive model to cause the predictive model to determine a likelihood that the user will decrease a taxable income for the user by filing an itemized deduction in a tax return of the user, according to one embodiment. In other words, the application of the user data to the predictive model enables the predictive model to determine the likelihood that the user will financially benefit from filing an itemized deduction rather than electing a standardized deduction with the user's tax return. Filing an itemized deduction with the tax return takes more time than electing the standardized deduction, so the process can save the user time and energy by correctly predicting whether the user receives any benefit from the additional burden/hassle of receiving, reviewing, and answering questions that are limited in use to preparing the user's itemized deduction. In some cases, the user may not even qualify for filing an itemized deduction, so the questions may confuse the user or incorrectly cause the user to believe that the tax return preparation system does not fully understand the user's particular situation.

At operation 508, the process deprioritizes tax return questions that are related to the itemized deduction, during a tax return preparation interview for the user, if the likelihood that the user will decrease the taxable income for the user by filing the itemized deduction is below a threshold, to reduce a quantity of time consumed by the user to prepare the tax return of the user with a tax return preparation system, according to one embodiment. The output of the predictive model is a floating number that is no less than 0 and that is no greater than 1, according to one embodiment. The output of the predictive model represents the likelihood that the user will financially benefit from filing an itemized deduction (rather than electing a standardized deduction). The tax return preparation system applies one or more thresholds to the predictive model, or to the output of the predictive model, to determine a level of confidence or a strength of the probability that the user should use an itemized deduction or should use a standardized deduction. In one embodiment, the tax return preparation system applies a first threshold, which when exceeded, indicates that the user is very likely to financially benefit from filing/preparing an itemized deduction. In one embodiment, the tax return preparation system applies a second threshold, which is indicative that the user is very likely to financially benefit more from a standardized deduction than from an itemized deduction, as long as the score is below the second threshold. In one embodiment, the tax return preparation system selects the first threshold, the second threshold, and/or one or more additional thresholds so that the tax return preparation system operates around a particular predetermined or desired operating characteristic of the predictive model. In one embodiment, the desired operating characteristic of the predictive model is determined in terms of one or more of a false-negative rate, a false positive rate, a true negative rate, and/or a true positive rate, according to various embodiments.

At operation 510, the process ends.

As noted above, the specific illustrative examples discussed above are but illustrative examples of implementations of embodiments of the method or process for improving retention of a user of a tax return preparation system. Those of skill in the art will readily recognize that other implementations and embodiments are possible. Therefore the discussion above should not be construed as a limitation on the claims provided below.

In accordance with an embodiment, a computing system implemented method identifies users who benefit from filing itemized deductions to reduce an average time consumed for users preparing tax returns with a tax return preparation system. The method includes receiving, with a computing system, user data that is associated with a user, according to one embodiment. The method includes applying, with the computing system, the user data to a predictive model to cause the predictive model to determine a likelihood that the user will decrease a taxable income for the user by filing an itemized deduction in a tax return of the user, according to one embodiment. The method includes deprioritizing/reordering/re-ranking/deemphasizing tax return questions that are related to the itemized deduction, from a tax return preparation interview for the user, if the likelihood that the user will decrease the taxable income for the user by filing the itemized deduction is below a threshold, to reduce a quantity of time consumed by the user to prepare the tax return of the user with a tax return preparation system, according to one embodiment.

In accordance with an embodiment, a system identifies users who benefit from filing itemized deductions to reduce an average time consumed for users preparing tax returns with a tax return preparation system. The system includes at least one processor, and at least one memory coupled to the at least one processor. The at least one memory stores instructions which, when executed by any set of the one or more processors, perform a process for identifying users who benefit from filing itemized deductions to reduce an average time consumed for users preparing tax returns with a tax return preparation system, according to one embodiment. The process includes receiving, with a computing system, user data that is associated with a user, according to one embodiment. The process includes applying, with the computing system, the user data to a predictive model to cause the predictive model to determine a likelihood that the user will decrease a taxable income for the user by filing an itemized deduction in a tax return of the user, according to one embodiment. The process includes deprioritizes/reranks/reorders tax return questions that are related to the itemized deduction, from a tax return preparation interview for the user, if the likelihood that the user will decrease the taxable income for the user by filing the itemized deduction is below a threshold, to reduce a quantity of time consumed by the user to prepare the tax return of the user with a tax return preparation system, according to one embodiment.

In accordance with an embodiment, a non-transitory computer readable medium includes instructions, which when executed by one or more processors, perform a method for identifying users who benefit from filing itemized deductions to reduce an average time consumed for users preparing tax returns with a tax return preparation system. The instructions include a tax return preparation engine configured to receive user data from a user of a tax return preparation system, in response to delivery of tax return questions to the user, according to one embodiment. The instructions include an analytics module having one or more predictive models that receive the user data and, in response to receipt of the user data, generates a score that is representative of a likelihood that the user will decrease a taxable income for the user by filing the itemized deduction more than by filing a standardized deduction in a tax return for the user, according to one embodiment. The tax return preparation engine deprioritizes/re-ranks at least some of the tax return questions from a tax return preparation interview for the user, if the score is lower than a predetermined threshold, to reduce an amount of time consumed in preparing the tax return for the user, according to one embodiment.

By applying analytics models to a tax return preparation system to identify users who benefit from filing itemized deductions and to reduce an average time consumed for users preparing tax returns with a tax return preparation system, implementation of embodiments of the present disclosure allows for significant improvement to the fields of user experience, electronic tax return preparation, data collection, and data processing, according to one embodiment. As one illustrative example, by deprioritizing tax questions that otherwise extend the tax return preparation interview (without financial gain to the user), embodiments of the present disclosure allows for progressing a user through a tax return preparation session with fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by selectively presenting itemized deduction questions to a user when the user financially benefits from an itemized deduction, the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for identifying users who benefit from filing itemized deductions to reduce an average time consumed for users preparing tax returns with a tax return preparation system, comprising:

training, using existing tax return data, a predictive model to use later-provided user data to produce an output including at least an indicator predictive of whether a user associated with the later-provided user data would benefit from itemized deductions or alternatively would benefit from the standard deduction;

receiving, with a computing system, user data that is associated with a user;

determining a first threshold which when applied to the output of the predictive model is indicative of whether a user is likely to benefit from itemized deductions;

determining a second threshold which when applied to the output of the predictive model is indicative of whether a user is likely to benefit from a standard deduction;

determining, by comparing predictions provided by the predictive model and actual outcomes, accuracy rates for a predictive model, the accuracy rates including one or more of a true positive rate, a true negative rate, a false positive rate and a false negative rate;

automatically adjusting one or more of the first threshold and the second threshold to cause changes in the determined accuracy rates to ensure that the predictive model operates within a predefined tolerance;

applying, with the computing system, the user data to a predictive model and the first threshold to determine whether the user will benefit from filing an itemized deduction in a tax return of the user; and deprioritizing tax return questions that are related to the itemized deduction, during a tax return preparation interview for the user, if the likelihood that the user will decrease the taxable income for the user by filing the itemized deduction is below a threshold, to reduce a quantity of time consumed by the user to prepare the tax return of the user with a tax return preparation system.

2. The method of claim 1, wherein the user data includes personal data, income data, and, if the user is a returning user to the tax return preparation system, data indicative of whether the user filed a previous years' itemized deduction.

3. The method of claim 1, wherein the user data is selected from a group of user data consisting of:

data indicating an age of the user;
data indicating an age of a spouse of the user;
data indicating a zip code;
data indicating a tax return filing status;
data indicating state income;
data indicating a home ownership status;
data indicating a home rental status;
data indicating a retirement status;
data indicating a student status;
data indicating an occupation of the user;
data indicating an occupation of a spouse of the user;
data indicating whether the user is claimed as a dependent;
data indicating whether a spouse of the user is claimed as a dependent;
data indicating whether another taxpayer is capable of claiming the user as a dependent;
data indicating whether a spouse of the user is capable of being claimed as a dependent;
data indicating salary and wages;
data indicating taxable interest income;
data indicating ordinary dividend income;
data indicating qualified dividend income;
data indicating business income;
data indicating farm income;
data indicating capital gains income;

data indicating taxable pension income;
data indicating pension income amount;
data indicating IRA distributions;
data indicating unemployment compensation;
data indicating taxable IRA;
data indicating taxable Social Security income;
data indicating amount of Social Security income;
data indicating amount of local state taxes paid;
data indicating whether the user filed a previous years' federal itemized deduction;
data indicating whether the user filed a previous years' state itemized deduction; and
data indicating whether the user is a returning user to the tax return preparation system.

4. The method of claim 3, wherein the group of user data further consists of:
data indicating an annual income;
data indicating an employer's address;
data indicating contractor income;
data indicating a marital status;
data indicating a medical history;
data indicating dependents;
data indicating assets;
data indicating spousal information;
data indicating children's information;
data indicating an address;
data indicating a name;
data indicating a Social Security Number;
data indicating a government identification;
data indicating a date of birth;
data indicating educator expenses;
data indicating health savings account deductions;
data indicating moving expenses;
data indicating IRA deductions;
data indicating student loan interest deductions;
data indicating tuition and fees;
data indicating medical and dental expenses;
data indicating state and local taxes;
data indicating real estate taxes;
data indicating personal property tax;
data indicating mortgage interest;
data indicating charitable contributions;
data indicating casualty and theft losses;
data indicating unreimbursed employee expenses;
data indicating an alternative minimum tax;
data indicating a foreign tax credit;
data indicating education tax credits;
data indicating retirement savings contributions; and
data indicating child tax credits.

5. The method of claim 1, wherein the tax return preparation interview includes an income section and a deductions section,
wherein deprioritizing the tax questions that are related to the itemized deduction includes optionally presenting the tax questions that are related to the itemized deduction near the end of the deductions section of the tax return preparation interview.

6. The method of claim 1, wherein the likelihood that the user will decrease the taxable income for the user by filing the itemized deduction is represented as an output from the predictive model, wherein the output is a floating point number that is no less than 0 and that is no greater than 1.

7. The method of claim 1, wherein the true positive rate is a number of users of the tax return preparation system who the predictive model correctly identifies as benefiting more from the itemized deduction than from a standardized deduction, divided by a total number of users who would benefit more from the itemized deduction than from the standardized deduction;
wherein the false negative rate is a number of users of the tax return preparation system who the predictive model incorrectly identifies as benefiting more from the standard deduction than from the itemized deduction, divided by the total number of users who would benefit more from the itemized deduction than from the standardized deduction;
wherein the false positive rate is a number of users of the tax return preparation system who the predictive model incorrectly identifies as benefiting more from the itemized deduction than from a standardized deduction, divided by a total number of users who would benefit more from the standardized deduction than from the itemized deduction; and
wherein the true negative rate is a number of users of the tax return preparation system who the predictive model correctly identifies as benefiting more from the standard deduction than from the itemized deduction, divided by the total number of users who would benefit more from the standardized deduction than from the itemized deduction.

8. The method of claim 1, further comprising applying the first threshold to the predictive model to obtain a false negative rate that is no greater than approximately 0.05.

9. The method of claim 1, further comprising applying the first threshold to the predictive model to obtain a false positive rate that is at most approximately 0.10.

10. The method of claim 1, wherein applying the user data to the predictive model includes repeatedly applying additionally received user data to the predictive model to cause the predictive model to update the likelihood that the user will decrease the taxable income for the user by filing the itemized deduction, at least partially based on the additionally received user data.

11. The method of claim 1, further comprising:
providing the likelihood that the user will decrease the taxable income for the user by filing the itemized deduction to a tax topic ranking algorithm within the tax return preparation system to enable the tax return preparation system to personalize a presentation of tax topics to the user at least partially based on the likelihood that the user will decrease the taxable income for the user by filing the itemized deduction.

12. The method of claim 1, further comprising:
prioritizing the tax return questions that are related to the itemized deduction, within the tax return preparation interview for the user, if the likelihood that the user will decrease the taxable income for the user by filing the itemized deduction is greater than the threshold.

13. The method of claim 1, further comprising:
training the predictive model with existing tax data collected by the tax return preparation system during one or more previous tax return preparation seasons.

14. The method of claim 13, further comprising:
adjusting the threshold to cause the tax return preparation system to operate around a predetermined operating point for the predictive model, wherein adjusting the threshold includes adjusting the threshold on a periodic basis while providing tax return preparation services to users with the tax return preparation system.

15. The method of claim 1, wherein the predictive model is one of a number of predictive models that are selected by the tax return preparation system to analyze the user data, at least partially based on one or more characteristics of the user data.

16. A system for identifying users who benefit from filing itemized deductions to reduce an average time consumed for users preparing tax returns with a tax return preparation system, the system comprising:
at least one processor; and
at least one memory coupled to the at least one processor, the at least one memory having stored therein instructions which, when executed by the at least one processor, perform a process for identifying users who benefit from filing itemized deductions to reduce an average time consumed for users preparing tax returns with a tax return preparation system, the process including:
receiving, with a computing system, user data that is associated with a user;
training, using existing tax return data, a predictive model to use later-provided user data to produce an output including at least an indicator predictive of whether a user associated with the later-provided user data would benefit from itemized deductions or alternatively would benefit from the standard deduction;
determining a first threshold which when applied to the output of the predictive model is indicative of whether a user is likely to benefit from itemized deductions;
determining a second threshold which when applied to the output of the predictive model is indicative of whether a user is likely to benefit from a standard deduction;
determining, by comparing predictions provided by the predictive model and actual outcomes, accuracy rates for a predictive model, the accuracy rates including one or more of a true positive rate, a true negative rate, a false positive rate and a false negative rate;
automatically adjusting one or more of the first threshold and the second threshold to cause changes in the determined accuracy rates to ensure that the predictive model operates within a predefined tolerance;
applying, with the computing system, the user data to a predictive model and the first threshold to whether the user will benefit from filing an itemized deduction in a tax return of the user rather than filing a standardized deduction; and
if the likelihood that the user will decrease the taxable income for the user by filing the itemized deduction is below a threshold, reordering a presentation of tax return questions to the user in a tax return preparation interview, so that tax return questions that are related to the itemized deduction are optionally presented near an end of a tax deduction section of the tax return preparation interview, to reduce a quantity of time consumed by the user to prepare the tax return of the user with a tax return preparation system.

17. The system of claim 16, wherein the user data includes personal data, income data, and, if the user is a returning user to the tax return preparation system, data indicative of whether the user filed a previous years' itemized deduction.

18. The system of claim 16, wherein the user data is selected from a group of user data consisting of:
data indicating an age of the user;
data indicating an age of a spouse of the user;
data indicating a zip code;
data indicating a tax return filing status;
data indicating state income;
data indicating a home ownership status;
data indicating a home rental status;
data indicating a retirement status;
data indicating a student status;
data indicating an occupation of the user;
data indicating an occupation of a spouse of the user;
data indicating whether the user is claimed as a dependent;
data indicating whether a spouse of the user is claimed as a dependent;
data indicating whether another taxpayer is capable of claiming the user as a dependent;
data indicating whether a spouse of the user is capable of being claimed as a dependent;
data indicating salary and wages;
data indicating taxable interest income;
data indicating ordinary dividend income;
data indicating qualified dividend income;
data indicating business income;
data indicating farm income;
data indicating capital gains income;
data indicating taxable pension income;
data indicating pension income amount;
data indicating IRA distributions;
data indicating unemployment compensation;
data indicating taxable IRA;
data indicating taxable Social Security income;
data indicating amount of Social Security income;
data indicating amount of local state taxes paid;
data indicating whether the user filed a previous years' federal itemized deduction;
data indicating whether the user filed a previous years' state itemized deduction; and
data indicating whether the user is a returning user to the tax return preparation system.

19. The system of claim 16, wherein the likelihood that the user will decrease the taxable income for the user by filing the itemized deduction is represented as an output from the predictive model, wherein the output is a floating point number that is no less than 0 and that is no greater than 1.

20. The system of claim 16, wherein the process further comprises:
applying the first threshold to the predictive model to obtain a false negative rate that is no greater than approximately 0.05,
wherein the false negative rate is a number of users of the tax return preparation system who the predictive model incorrectly identifies as benefiting more from a standard deduction than from the itemized deduction, divided by a total number of users who would benefit more from the itemized deduction than from the standardized deduction.

21. The system of claim 16, wherein the process further comprises:
applying the first threshold to the predictive model to obtain a false positive rate that is at most approximately 0.10,
wherein the false positive rate is a number of users of the tax return preparation system who the predictive model incorrectly identifies as benefiting more from the itemized deduction than from a standardized deduction, divided by a total number of users who would benefit more from the standardized deduction than from the itemized deduction.

22. The system of claim 16, wherein the threshold is a first threshold, wherein the process further comprises:
    prioritizing a presentation of the tax return questions that are related to the itemized deduction, within the tax return preparation interview for the user, if the likelihood that the user will decrease the taxable income for the user by filing the itemized deduction is above a second threshold, to reduce a quantity of taxable income for the user.

23. The system of claim 16, wherein applying the user data to the predictive model includes repeatedly applying additionally received user data to the predictive model to cause the predictive model to update the likelihood that the user will decrease the taxable income for the user by filing the itemized deduction, at least partially based on the additionally received user data.

24. The system of claim 16, wherein the process further comprises:
    providing the likelihood that the user will decrease the taxable income for the user by filing the itemized deduction to a tax topic ranking algorithm within the tax return preparation system to enable the tax return preparation system to order a presentation of tax topics to the user at least partially based on the likelihood that the user will decrease the taxable income for the user by filing the itemized deduction.

25. The system of claim 16, wherein the process further comprises:
    prioritizing the tax return questions that are related to the itemized deduction, within the tax return preparation interview for the user, if the likelihood that the user will decrease the taxable income for the user by filing the itemized deduction is greater than the threshold.

26. A non-transitory computer readable medium having instructions, which when executed by one or more processors, perform a method for identifying users who benefit from filing itemized deductions to reduce an average time consumed for users preparing tax returns with a tax return preparation system, the instructions comprising:
    establishing a tax return preparation engine configured to receive user data from a user of a tax return preparation system, in response to delivery of tax return questions to the user; and
    establishing and training, using existing tax return data, an analytics module having one or more predictive models that receive the user data and, in response to receipt of the user data, generates a score that is representative of a likelihood that the user will decrease a taxable income for the user by filing the itemized deduction more than by filing a standardized deduction in a tax return for the user, the analytics module further for:
        determining a first threshold which when applied to the output of the predictive model is indicative of whether a user is likely to benefit from itemized deductions;
        determining a second threshold which when applied to the output of the predictive model is indicative of whether a user is likely to benefit from a standard deduction;
        determining, by comparing predictions provided by the predictive model and actual outcomes, accuracy rates for a predictive model, the accuracy rates including one or more of a true positive rate, a true negative rate, a false positive rate and a false negative rate with respect to predictions provided by the predictive model; and
        automatically adjusting one or more of the first threshold and the second threshold to cause changes in the determined accuracy rates to ensure that the predictive model operates within a predefined tolerance;
    wherein the tax return preparation engine postpones presentation of at least some of the itemized deduction tax return questions from a tax return preparation interview for the user, if the score is lower than a predetermined threshold, to reduce an amount of time consumed in preparing the tax return for the user.

* * * * *